United States Patent
Olmstead et al.

(10) Patent No.: US 11,175,147 B1
(45) Date of Patent: Nov. 16, 2021

(54) ENCOURAGING AND IMPLEMENTING USER ASSISTANCE TO SIMULTANEOUS LOCALIZATION AND MAPPING

(71) Applicant: Digital Dream Labs, LLC, Pittsburgh, PA (US)

(72) Inventors: Clifford Dill Olmstead, San Francisco, CA (US); Bradford Neuman, San Francisco, CA (US)

(73) Assignee: DIGITAL DREAM LABS, LLC, Pittsburgh, PA (US)

( * ) Notice: Subject to any disclaimer, the term of this patent is extended or adjusted under 35 U.S.C. 154(b) by 351 days.

(21) Appl. No.: 16/041,537

(22) Filed: Jul. 20, 2018

(51) Int. Cl.
  *G01C 21/32* (2006.01)
  *G05D 1/00* (2006.01)
  (Continued)

(52) U.S. Cl.
  CPC .......... *G01C 21/32* (2013.01); *G05D 1/0088* (2013.01); *G06F 3/16* (2013.01); *G06K 9/00369* (2013.01); *G06K 9/00664* (2013.01); *H04W 4/40* (2018.02); *G05D 2201/0207* (2013.01); *G05D 2201/0209* (2013.01)

(58) Field of Classification Search
  CPC ......... G06E 15/50; G01S 5/00; G01S 5/0009; G01S 5/0063; G01S 5/016; G01S 5/013; B60W 2520/06; B60W 2550/00; B60W 2550/10; B60W 2550/40; G01C 21/00; G01C 21/005; G01C 21/20; G01C 21/32; G05D 1/00; G05D 1/0011; G05D 2201/0207; G05D 2201/0209; G05D 2201/00; G05D 2201/0215; G05D 2201/0216; G05D 2201/0211; G05D 3/00; G05D 3/12; G05D 1/0088; G05D 1/02; G05D 1/0231; G05D 1/0234; G05D 1/0236; G05D 1/0238; G05D 1/024; G05D 1/0242; G05D 1/0246; G05D 1/0248; G05D 1/0274; G05D 1/0276; G05D 1/0278; G06K 9/00369; G06K 9/00; G06K 9/00664; G05B 13/00; G05B 13/0265; G05B 13/027; G06F 19/00; G06F 3/00; G06F 3/0116; H04W 8/00; H04W 8/08; H04W 8/22; H04W 4/00; H04W 4/02; H04W 4/021; H04W 4/12;
  (Continued)

(56) References Cited

U.S. PATENT DOCUMENTS

| | | | | |
|---|---|---|---|---|
| 7,957,837 | B2 * | 6/2011 | Ziegler | G16H 20/00 700/258 |
| 9,592,609 | B2 * | 3/2017 | LaFary | B25J 9/1676 |
| 10,168,699 | B1 * | 1/2019 | Theobald | G05D 1/0088 |

* cited by examiner

*Primary Examiner* — Anthony R Jimenez
(74) *Attorney, Agent, or Firm* — David G. Oberdick

(57) ABSTRACT

Methods, systems, and apparatus, including computer programs encoded on computer storage media, for user assisted simultaneous localization and mapping (SLAM). These technologies can involve a robot including: one or more processors; one or more sensor subsystems; and one or more storage devices storing instructions that are operable, when executed by the one or more processors, to cause the agent to perform operations including: receiving first sensor data from the one or more sensor subsystems; determining the presence of a human based at least in part on the first sensor data; receiving second sensor data from the one or more sensor subsystems, the second sensor data indicating an action of the human; and determining at least one of mapping data and localization data based at least in part on the second sensor data.

18 Claims, 4 Drawing Sheets

(51) Int. Cl.
*G06K 9/00* (2006.01)
*H04W 4/40* (2018.01)
*G06F 3/16* (2006.01)

(58) Field of Classification Search
CPC ......... H04W 4/18; H04W 4/029; H04W 4/33; H04W 4/38; H04W 4/40
USPC ........................................................ 701/446
See application file for complete search history.

ENCOURAGING AND IMPLEMENTING USER ASSISTANCE TO SIMULTANEOUS LOCALIZATION AND MAPPING

BACKGROUND

This specification relates to simultaneous localization and mapping (SLAM). In robotic mapping and navigation, SLAM is the computational problem of constructing or updating a map of an unknown environment while simultaneously keeping track of an agent's location within that environment.

SUMMARY

This specification describes technologies for user-assisted simultaneous localization and mapping (SLAM).

In general, one innovative aspect of the subject matter described in this specification can be embodied in a robot including: one or more processors; one or more sensor subsystems; and one or more storage devices storing instructions that are operable, when executed by the one or more processors, to cause the agent to perform operations. The operations can include: receiving first sensor data from the one or more sensor subsystems; determining the presence of a human based at least in part on the first sensor data; receiving second sensor data from the one or more sensor subsystems, the second sensor data indicating an action of the human; and determining at least one of mapping data and localization data based at least in part on the second sensor data.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination.

The operations can further include prompting the human for input and receiving second sensor data indicating an action can include receiving second sensor data indicating an action in response to the prompting. Prompting the human can include prompting the human with sound.

The operations can further include prompting the human for input via a mobile computing device. Prompting the user for input via a mobile computing device can include prompting the human to record a portion of an environment using a camera on the mobile computing device.

The operations can further include physically navigating the robot around an environment to generate a map of the environment of the robot.

The operations can further include updating an emotion state of the robot by increasing one or more emotional aspects of the emotion state; and selecting an action for the robot to perform based on the updated emotion state of the robot.

Determining the presence of a human based at least in part on the first sensor data can include identifying the human based at least in part on the first sensor data and wherein the operations further comprise selecting an action for the robot to perform based at least in part on the human's identity.

The second sensor data can include the first sensor data. The robot can be a security robot. The robot can be a drone.

In general, another innovative aspect of the subject matter described in this specification can be embodied in an agent including: one or more processors; one or more sensor subsystems; and one or more storage devices storing instructions that are operable, when executed by the one or more processors, to cause the agent to perform operation. The operation can include: receiving first sensor data from the one or more sensor subsystems; determining the presence of a living being based at least in part on the first sensor data; receiving second sensor data from the one or more sensor subsystems, the second sensor data indicating an action of the living being; and determining mapping data based at least in part on the second sensor data.

The living being can be a human and the operations can further include prompting the human for input and receiving second sensor data can include receiving input, via the second sensor date, in response to the prompting. Prompting the human can include prompting the human with sound. The operations can further include prompting the human for input via a mobile computing device. Prompting the human for input via a mobile computing device can include prompting the human to record a portion of an environment using a camera on the mobile computing device. The operations can further include physically navigating the agent around an environment to generate a map of the environment of the agent.

Determining the presence of a living being based at least in part on the first sensor data can include identifying a human based at least in part on the first sensor data and the operations can further include updating an emotion state of the agent by increasing one or more emotional aspects of the emotion state and selecting an action for the agent to perform based on the updated emotion state of the agent and based on the human's identity. The operations can further include detecting based at least in part on the first sensor data a living being that is in sufficient proximity to the agent such that the agent can obtain sensor data regarding actions of the living being.

In general, another innovative aspect of the subject matter described in this specification can be embodied in a system includes a robot having: one or more processors; one or more sensor subsystems; one or more storage devices storing instructions that are operable, when executed by the one or more processors, to cause the agent to perform robot operations. The operations can include: receiving first sensor data from the one or more sensor subsystems; determining the presence of a user based at least in part on the first sensor data; receiving second sensor data from the one or more sensor subsystems regarding actions of the user; and determining mapping data based at least in part on the second sensor data. The system can further include an application configured for operation on a mobile computing device and configured for user interaction with the robot. The robot operations can further include prompting the human to record a portion of an environment using a camera on the mobile computing device, the application can perform application operations including transmitting a recorded portion of the environment to the robot, and the robot operations further can further include receiving the recorded portion of the environment and modifying a map based at least in part on the recorded portion of the environment.

The subject matter described in this specification can be implemented in particular embodiments so as to realize one or more of the following advantages. Typical SLAM approaches rely on sensors located on the robot itself as the source for the data used to perform SLAM. However, if there is a human involved at any point in the SLAM process it makes sense for SLAM processes, i.e., the SLAM processes described in this specification, to enlist the human's assistance to improve the results. Not only will such a user assisted SLAM process produce a better map but the resulting map and robot performance will be more tailored to the specific human(s) in question relative to a SLAM process that does not take into account human input. The term "user" in the context of this specification includes a variety of individuals with whom the robot comes in contact and not just the individual who purchased the robot or who first interacts with the robot.

In addition, systems and methods described in this specification do not involve adding additional sensors or processing power to the robot to enhance the SLAM results. Rather, user-assisted SLAM processes described in this specification take advantage of living beings nearby to improve the SLAM results, e.g., by observing behavior, interacting with a nearby human for example by asking questions or by interacting with a user's mobile computing device (such as by leveraging the sensors on the user's smartphone).

Furthermore, a robot that exhibits life-like behaviors may increase user engagement with the robot. For example, small animated movements, noises, and simulated facial changes in between and in addition to specific, purposeful robotic animations create a sense of a life-like quality of a robot. Such life-like behaviors over time elicit more and higher-quality human input which in turn results in a more effective robot and a better user experience relative to a robot that does not exhibit such behaviors. Another advantage is that when a user is involved in and contributes to the creation of a map, he or she may also have an improved experience and sense of ownership and authorship over the map and the entire robot and robot system itself. Where the robot is life-like, the user will also have a sense that he or she "helped" the robot, contributing to a virtuous cycle of goodwill where the user feels like the robot is taking care of her, and she of it. Stated differently, where a robot exhibits life-like behaviors, character traits or simulates emotions, especially when it does so in a manner personalized to a user, the user can have more fun; the user can feel more ownership, interact with the robot, more and/or have a more personalized experience. Furthermore, if the user is involved in creating, and has a good understanding of, the map and has a good understanding of how the system works, the user may trust the system more both to perform its duties and to respect the user's privacy.

Systems and methods described in this specification can discover areas that are blocked or otherwise outside of the range of sensors attached to the robot. Furthermore, a human can point out areas that he or she knows are bad for the robot. For example, a human can indicate to a robot (by words, gestures or otherwise): long shag carpet that will can cause the robot to become stuck, a pool of water (e.g., a swimming pool), freshly lacquered wood floor (e.g., "this is a 24-48 hour no walk zone"), and private rooms that the human doesn't want the robot to enter. The user-assisted SLAM processes described in this specification can also be used to keep a robot away from certain objects such as an aquarium which would be marked in the SLAM database as a "do-not-go" zone so the robot doesn't go near it.

This system also helps a user become more comfortable with the concept of a robot in her home because she develops a natural sense for the limitations of the robot and comes to appreciate better how the robot understands the world. The user comes to appreciate better how the robot understands the world because the robot interacts with the human to help the robot fill the gaps in the robot's ability to understand its environment, e.g., to help the robot fill in the gaps in the robot's view).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
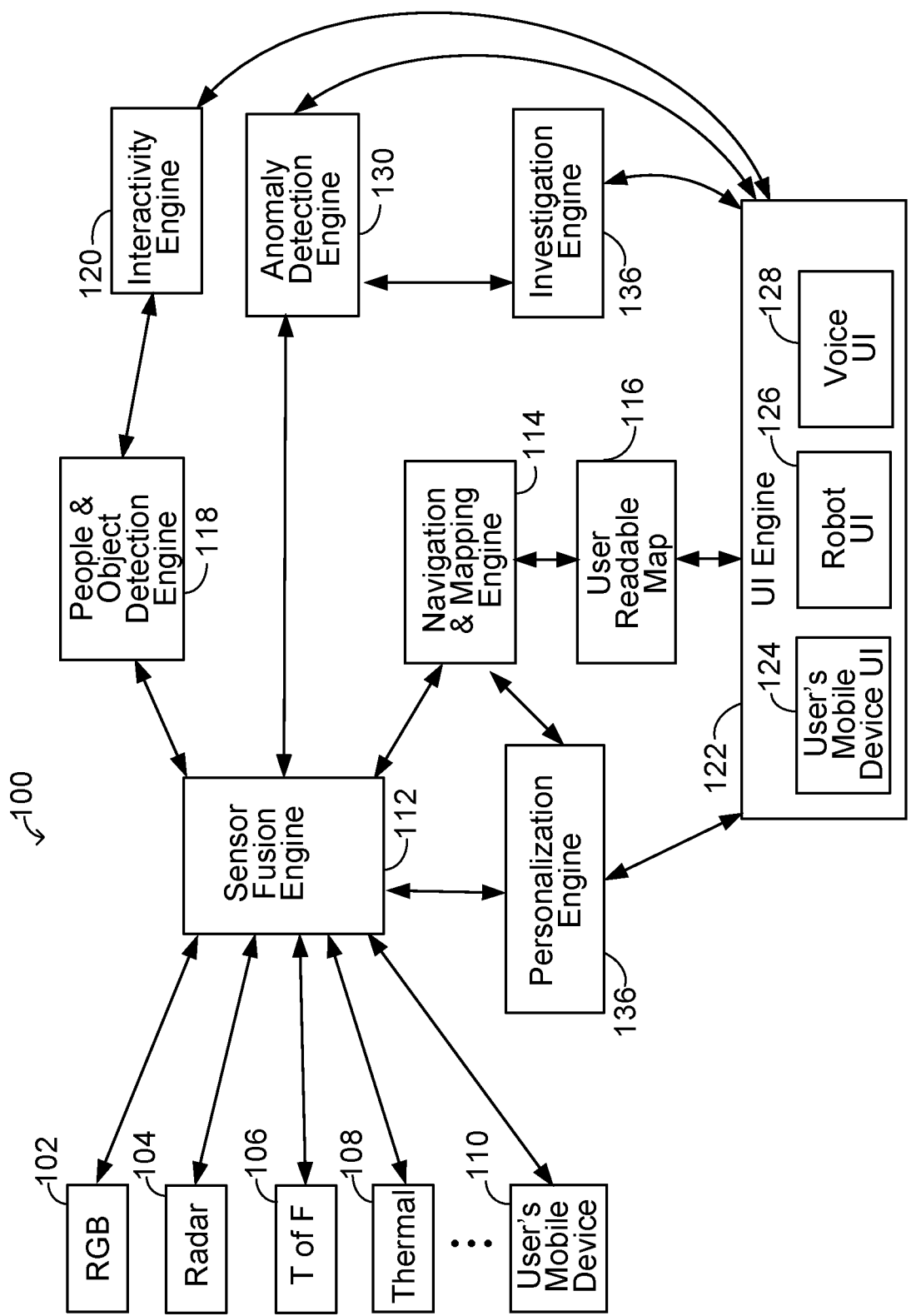
FIG. 1 is a block diagram of one example of a user assisted SLAM system.

This specification relates to user-assisted simultaneous localization and mapping (SLAM). Achieving high-quality SLAM is a significant challenge in robotics. SLAM involves estimating the position of a robot and creating a map that can be used for navigation purposes. The SLAM process can happen on the robot (the robot estimating the position of itself) or off-board, or include one robot figuring out the position of another. Traditionally SLAM is performed automatically with input from sensors. Particularly in heterogeneous, non-sheltered environments and in homes, traditional SLAM approaches are susceptible to numerous problems especially when it comes to creating an accurate map. One of the biggest problems has to do with sensor range and the inability for a given sensor to see the far reaches of certain floor plans. Another problem occurs during the mapping phase; when a robot is investigating an area it may simply miss a region, e.g., because something blocks the robot's physical access to the region. For example the region may be blocked because a door is closed, or there's a passageway too narrow for the robot to get through (e.g., a chair is closer to the wall than the width the robot would need to pass through).

Another issue with traditional SLAM in cluttered, indoor environments is determining actual room boundaries when generating a map. Furniture and other objects against the wall can look like part of the wall in many practical SLAM approaches. Thus, having a SLAM process that can leverage interaction with a living being to correct or verify room boundaries is useful.

In addition, sensors with limited sensitivity relative to the human eye often result in a warped map or a map that is a hard to visualize by a human.

In order to solve these problems and create a better map, particularly of a home, a robot can enlist the assistance of a user or human being. The term "user" or "human" in the context of this specification includes a variety of individuals with whom the robot comes in contact and not just the individual who purchased the robot or who first interacts with the robot. During an initial mapping phase (e.g., during a "walk-through"), which comes after a human has purchased a robot and taken that robot to his or her home, a human is typically accompanying the robot and thus is a readily available resource. Even if a human is not available during the initial mapping phase, human input can still be used retroactively. Some examples of human input that would aid the robot include (but are not limited to) using a sensor on an cooperating human's mobile phone to enhance the range and quality of the sensors on the robot, having the robot ask questions (or be told without asking) about the rooms and areas that it "sees" (either aloud by voice, in a mobile computing device application context, through the robot's screen by touch, or by some other interface), and having the user-assisted SLAM process make determinations based at least in part on the human's actions.

If a user has a smart-phone they can aid the robot in producing a map by simply using the sensors equipped with the user's smartphone. This essentially extends the range of the robot's sensors and can provide a close up view to objects and surfaces. For instance, the robot could be in an area with a lot of clutter that prevents the robot from exploring certain areas. The robot could be in a room with stairs that the robot cannot traverse. In both of these instances the robot could ask for more data or a user can provide additional data on her own initiative. The user can capture the additional with sensors on her mobile computing device, e.g., her smart-phone. This data can be used to enhance the existing map or fill in areas that the robot cannot see.

The robot could greatly enhance the accuracy of its map by simply asking a nearby human questions. For instance, if the robot is unsure if a flat area is a wall or just furniture it could ask the nearby human. During this exchange the robot or an associated application could show an image of the wall in question, or a floor plan with the wall in question highlighted. The information gleaned from the user's answer to this question could greatly enhance an existing map's accuracy. Another example of a user-assisted SLAM process enhancing the resulting map from human input is simply for the robot's sensors to listen to what a nearby human says, for example during a walking tour of an environment (a "walk-through"). During the walk-through, for instance, the person accompanying the robot could point to an area of the floor and tell the robot 'don't go here." The robot would then mark this area as a region where it should not go. Another example of an un-initiated interaction would be if the person giving the robot a tour points to a door during the walk-through and tells the robot "this is a door", then the robot could mark that as a potentially traversable area. Similarly, the user could say to the robot, "this is where the kids come in and take off their shoes and jackets after school," and the robot could add to the map that the area noted includes both an entry point, and a storage area whose contours and colors may change based on the time of day for example when the hook rack on the wall is filled with jackets in the afternoon, versus empty during the school day.

Another way the user-assisted SLAM process can enhance its map through human interaction is by simply watching what a nearby human does. For instance, during the mapping phase ("walk-through") the robot could watch the human as he walks across the room and pushes a door open. This would then be marked in the map as a door so that, in the future, the user-assisted SLAM process records the area of the door as being a possibly traversable path and, if the door is closed, the robot may attempt to push it open. In addition, if the robot's sensors detect a human walking over an area that was previously marked as non-traversable, the user-assisted SLAM process can mark the identified area as traversable for the future.

FIG. 1 shows an example user-assisted SLAM system 100. The user-assisted SLAM system includes a set of sensors, e.g., an RGB sensor 102, radar 104, a time of flight (ToF) sensor 106, and a thermal sensor 108. These sensors can be attached to the robot performing the user-assisted SLAM and some of the sensors can be located elsewhere and communicate to the robot's user-assisted SLAM process via known methods, e.g., via wireless communication technologies. The set of sensors providing data to the user-assisted SLAM system can also include one or more sensors on a user's mobile device 110, e.g., on a user's smartphone.

A sensor fusion engine 112 receives data from a set of sensors relevant to a particular purpose, e.g., navigation and mapping, and can associate the data from each of the relevant sensors with a confidence score. The sensor fusion engine then exposes the sensor data and the confidence scores to its clients, e.g., the navigation and mapping engine 114, the people and object detection engine 118, the anomaly detection engine 130, or the personalization engine 136.

For example, with regard to the navigation and mapping engine 114, the sensor fusion engine 112 can receive data from: a LIDAR (light detection and ranging) sensor, a camera, and wheel encoders. Rather than trusting just one of these sensors, the sensor fusion engine can associate the sensor data from each of the sensors with a confidence score and expose the data and the confidence scores to the navigation and mapping engine 114. The navigation and mapping engine in turn can engage in a SLAM process to combine the weighted sensor data to develop a map and determine where the robot is located.

The navigation and mapping engine 114 can develop at least in part a user readable map 116. The user readable map is accessible via a user interface (UI) engine 122 that can include a UI for a mobile device application 124, a robot UI 126 (including display and behavior), and a voice user interface 128.

With regard to the people and object detection engine 118, the sensor fusion engine 112 can receive data from a RGB sensor, a time of flight (ToF) sensor and a thermal sensor. The sensor fusion engine can associate the data from each of the sensors with a confidence score and expose both the sensor data and the confidence scores to the people and object detection engine 118. A thermal sensor can give a strong signal for person detection. If an object is both warm and person-shaped, that is a strong indication that the object is a person. However there are cases where an object may not have those characteristics but is still a person. For example if a thermal sensor is sensing through a piece of glass or if the sensor is far from the object the system may benefit from additional sensors.

With regard to determining a confidence score, one can use covariance, which is a multi-dimensional form of variance (related to the standard deviation of a measurement). One sensor may indicate that an object is in a given position with a given probability distribution (could be 2d, 3d, 6d, or something in between) and then the estimate involves computing the maximum a posteriori (MAP) estimate. This approach is also known as the kalman filter approach. Another common approach is known as the particle filter approach which uses a discrete set of particles to estimate a position, and updates those particles according to an update rule based on the confidence.

A confidence score can be treated using a simpler threshold-based rule, e.g., discard a sample if confidence is less than a specified value, keep a sample and average it in with other samples if the confidence score is below a specified medium value, and accept the sample as truth if the confidence score is above a specified value)

Allowing for the combination of data from multiple sensors allows the system to use less expensive sensors with lower resolution. For example, if a robot has a low resolution thermal sensor, but the process combines the thermal data with RGB sensor data, the system can better determine if there is a person in the area relative to using just a single sensor of similar quality. The people and object detection engine would, probably ideally, this would be some sort of machine learned automatic model rather than hand tuning all those things.

The system 100 can take advantage of machine learning techniques to further improve its sensor requirements. For example, if the system has a thermal camera and the sensor determines the presence of a human with high confidence, the system can collect that data and RGB sensor data at the same time. The system can add that RGB sensor data to a training data set of a person. And then the system can improve its ability to detect a person using RGB data by developing a machine learning model that is trained using the collected training data.

Use of skeleton detection for gesture recognition provides an example of the use of a confidence score. In this context, there are scoring methods associated with classifying a particular movement as a particular gesture. The system can compare scores by converting the scores to a percentage or otherwise normalizing the scores to indicate confidence.

The people and objection detection engine 118 can communicate directly with the UI engine 122 or it can communicate with an interactivity engine 120 which in turn can communicate with the UI engine. In certain embodiments, the people and objection detection engine 118 can identify an individual and pass information about the individual to the interactivity engine 120.

Figure 2:
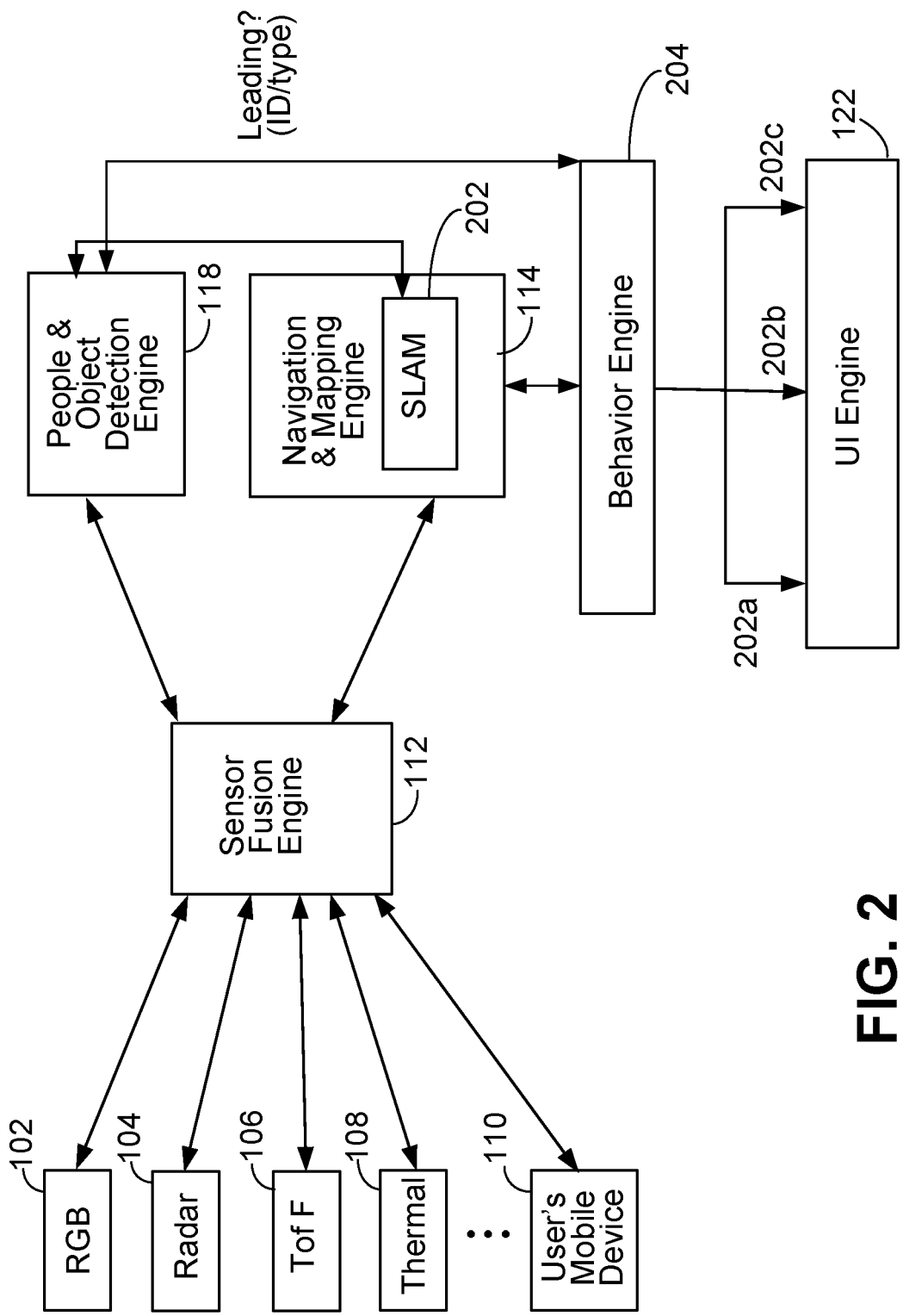
FIG. 2 is a block diagram of another example of a user-assisted SLAM system.

FIG. 2 is a block diagram of another example of a user-assisted SLAM system. FIG. 2 illustrates the same set of sensors providing data to a sensor fusion engine as illustrated in FIG. 1. FIG. 2 also illustrates a navigation and mapping engine 114 and people and object detection (POD) engine 118 both in communication with the sensor fusion engine 112. The navigation and mapping engine includes a SLAM process 202. The POD engine 118 can communicate to the user assisted SLAM process when a human is near the robot and the POD engine 118 can communicate to a behavior engine 204 the identification number and/or type (child, common adult, rare adult, etc) of a nearby human. In addition, the POD engine can communicate to the behavior engine whether the detected human is leading the robot or exhibiting some other action.

The behavior engine 204 can in turn communicate with a user interface engine (UI) 122. the behavior engine 204 can send various signals to the UI engine 122 including an indication that the robot and its user-assisted SLAM process is in one of the following behavioral modes: a) autonomous mode 202a, b) observation mode where the robot merely observes a nearby human's behavior 202b, or c) interaction mode where the robot affirmatively solicits a response from a nearby human via the UI engine 122.

Returning to FIG. 1, the system 100 can also include an anomaly detection engine 130. The anomaly detection engine 130 can receive sensor data derived from sensors and confidence scores associated with the sensor data from the sensor fusion engine 112. The anomaly detection engine can operate to detect situations that are not on system's map and that present a potential challenge to the robot, e.g., a navigation challenge, and to communicate with an investigation engine 136. The investigation engine 136 can in turn communicate with the UI engine 122 as part of providing instructions to a robot operating system (not shown) to take action to investigate the anomaly. A robot operating system (ROS) is robotics middleware (i.e. a collection of software frameworks for robot software development). ROS provides services designed for a heterogeneous computer cluster such as hardware abstraction, low-level device control, implementation of commonly used functionality, message-passing between processes, and package management.

With continuing reference to FIG. 1, the system 100 can also include a personalization engine 136. The personalization engine 136 can receive sensor data derived from sensors and confidence scores associated with the sensor data from the sensor fusion engine 112 and determine if the robot's environment merits personalization of the user-assisted SLAM system or other aspects of the robot's operation. For example, if the robot's environment is a building in a very hot environment, the personalization engine 136 may reduce the confidence score of the thermal sensor. Similarly if the environment is very noisy, the personalization engine may reduce the confidence score of audio data. The personalization engine 136 can communicate with the UI engine 122, with other engines such as the navigation and mapping engine 114 (e.g., to indicate that a particular room is hot and thus the thermal sensor should not be relied on as much in the specified room), and with the robot operating system (not shown).

Figure 3:
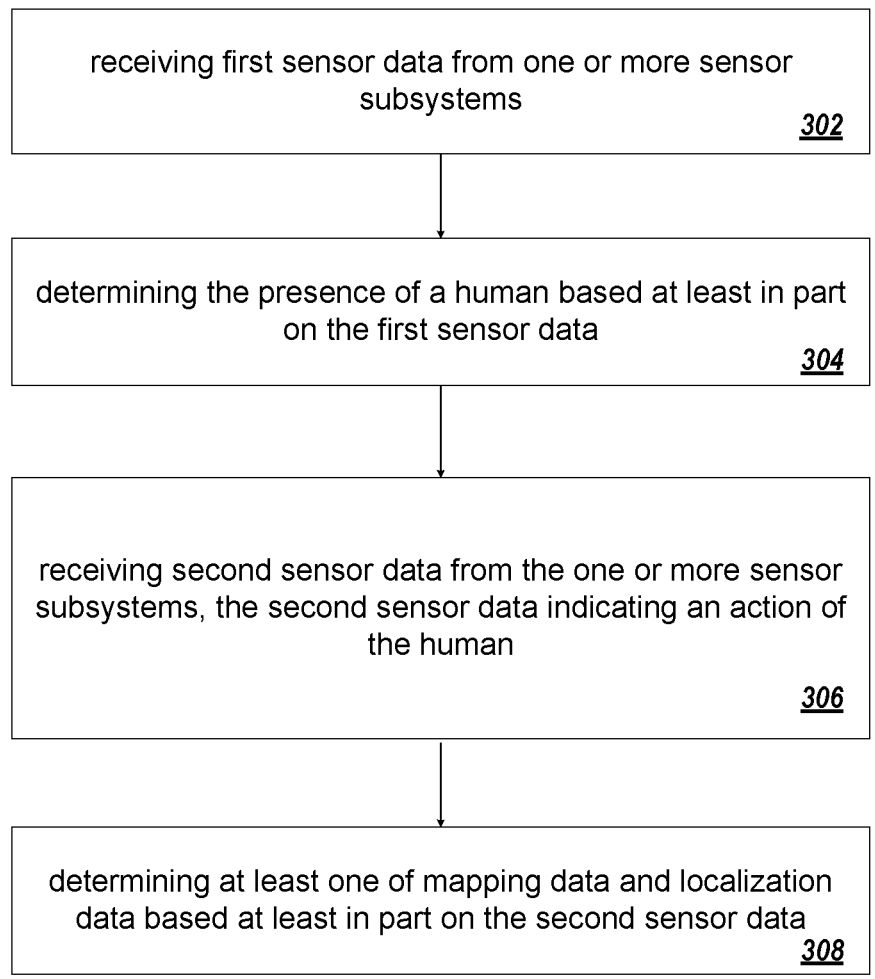
FIG. 3 is a flowchart of an example user assisted SLAM process.

FIG. 3 is a flowchart of an example process 300 for a user-assisted SLAM process. For convenience, the process 300 will be described as being performed by a system of one or more computers, located in one or more locations, and programmed appropriately in accordance with this specification. For example, a user-assisted SLAM system, e.g., the user-assisted SLAM system 100 of FIG. 1, appropriately programmed, can perform the process 300. The process 300 includes: receiving 302 first sensor data from one or more sensor subsystems; determining 304 the presence of a human based at least in part on the first sensor data; receiving 306 second sensor data from the one or more sensor subsystems, the second sensor data indicating an action of the human; and determining 308 at least one of mapping data and localization data based at least in part on the second sensor data.

Figure 4:
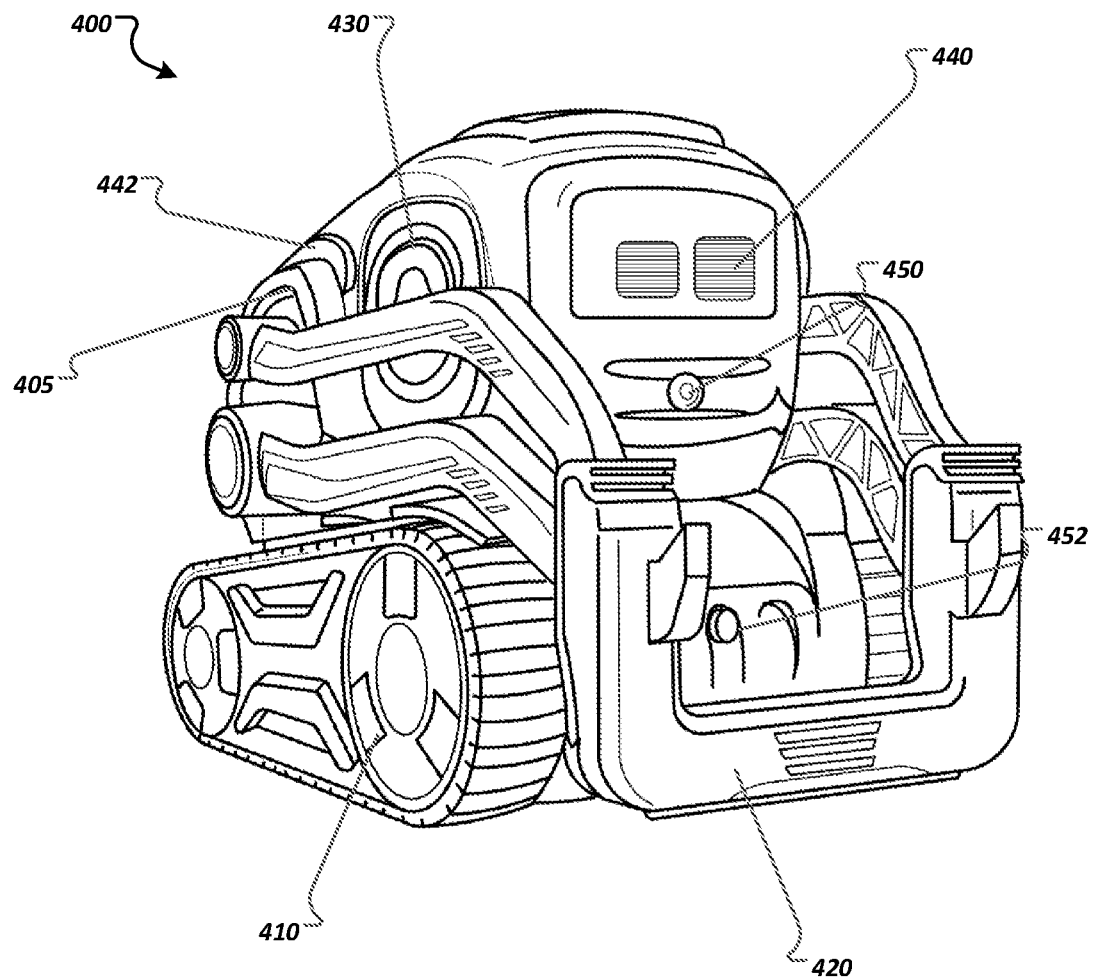
FIG. 4 illustrates an example robot.

FIG. 4 illustrates an example robot 400. The robot 400 is an example of a mobile autonomous robotic system that can serve as a character-driven agent for implementing the techniques described in this specification. The robot 400 can use the techniques described above for a variety of uses e.g., as a toy, as a personal companion or as a security robot.

The robot 400 generally includes a body 405 and a number of physically moveable components. The components of the robot 400 can house data processing hardware and control hardware of the robot. The physically moveable components of the robot 400 include a propulsion system 410, a lift 420, and a head 430.

The robot 400 also includes integrated output and input subsystems.

The output subsystems can include control subsystems that cause physical movements of robotic components; presentation subsystems that present visual or audio information, e.g., screen displays, lights, and speakers; and communication subsystems that communicate information across one or more communications networks, to name just a few examples.

The control subsystems of the robot 400 include a locomotion subsystem 410. In this example, the locomotion system 410 has wheels and treads. Each wheel subsystem can be independently operated, which allows the robot to spin and perform smooth arcing maneuvers. In some implementations, the locomotion subsystem includes sensors that provide feedback representing how quickly one or more of the wheels are turning. The robot can use this information to control its position and speed.

The control subsystems of the robot 400 include an effector subsystem 420 that is operable to manipulate objects in the robot's environment. In this example, the effector subsystem 420 includes a lift and one or more motors for controlling the lift. The effector subsystem 420 can be used to lift and manipulate objects in the robot's environment. The effector subsystem 420 can also be used as an input subsystem, which is described in more detail below.

The control subsystems of the robot 400 also include a robot head 430, which has the ability to tilt up and down and optionally side to side. On the robot 400, the tilt of the head 430 also directly affects the angle of a camera 450.

The presentation subsystems of the robot 400 include one or more electronic displays, e.g., electronic display 440, which can each be a color or a monochrome display. The electronic display 440 can be used to display any appropriate information. In FIG. 1, the electronic display 440 is presenting a simulated pair of eyes that can be used to provide character-specific information. The presentation subsystems of the robot 400 also include one or more lights 442 that can each turn on and off, optionally in multiple different colors.

The presentation subsystems of the robot 400 can also include one or more speakers, which can play one or more sounds in sequence or concurrently so that the sounds are at least partially overlapping.

The input subsystems of the robot 400 include one or more perception subsystems, one or more audio subsystems, one or more touch detection subsystems, one or more motion detection subsystems, one or more effector input subsystems, and one or more accessory input subsystems, to name just a few examples.

The perception subsystems of the robot 400 are configured to sense light from an environment of the robot. The perception subsystems can include a visible spectrum camera, an infrared camera, or a distance sensor, to name just a few examples. For example, the robot 400 includes an integrated camera 450. The perception subsystems of the robot 400 can include one or more distance sensors. Each distance sensor generates an estimated distance to the nearest object in front of the sensor.

The perception subsystems of the robot 400 can include one or more light sensors. The light sensors are simpler electronically than cameras and generate a signal when a sufficient amount of light is detected. In some implementations, light sensors can be combined with light sources to implement integrated cliff detectors on the bottom of the robot. When light generated by a light source is no longer reflected back into the light sensor, the robot 400 can interpret this state as being over the edge of a table or another surface.

The audio subsystems of the robot 400 are configured to capture from the environment of the robot. For example, the robot 400 can include a directional microphone subsystem having one or more microphones. The directional microphone subsystem also includes post-processing functionality that generates a direction, a direction probability distribution, location, or location probability distribution in a particular coordinate system in response to receiving a sound. Each generated direction represents a most likely direction from which the sound originated. The directional microphone subsystem can use various conventional beam-forming algorithms to generate the directions.

The touch detection subsystems of the robot 400 are configured to determine when the robot is being touched or touched in particular ways. The touch detection subsystems can include touch sensors, and each touch sensor can indicate when the robot is being touched by a user, e.g., by measuring changes in capacitance. The robot can include touch sensors on dedicated portions of the robot's body, e.g., on the top, on the bottom, or both. Multiple touch sensors can also be configured to detect different touch gestures or modes, e.g., a stroke, tap, rotation, or grasp.

The motion detection subsystems of the robot 400 are configured to measure movement of the robot. The motion detection subsystems can include motion sensors and each motion sensor can indicate that the robot is moving in a particular way. For example, a gyroscope sensor can indicate a relative orientation of the robot. As another example, an accelerometer can indicate a direction and a magnitude of an acceleration, e.g., of the Earth's gravitational field.

The effector input subsystems of the robot 400 are configured to determine when a user is physically manipulating components of the robot 400. For example, a user can physically manipulate the lift of the effector subsystem 420, which can result in an effector input subsystem generating an input signal for the robot 400. As another example, the effector subsystem 120 can detect whether or not the lift is currently supporting the weight of any objects. The result of such a determination can also result in an input signal for the robot 400.

The robot 400 can also use inputs received from one or more integrated input subsystems. The integrated input subsystems can indicate discrete user actions with the robot 400. For example, the integrated input subsystems can indicate when the robot is being charged, when the robot has been docked in a docking station, and when a user has pushed buttons on the robot, to name just a few examples.

The robot 400 can also use inputs received from one or more accessory input subsystems that are configured to communicate with the robot 400. For example, the robot 400 can interact with one or more cubes that are configured with electronics that allow the cubes to communicate with the robot 400 wirelessly. Such accessories that are configured to communicate with the robot can have embedded sensors whose outputs can be communicated to the robot 400 either directly or over a network connection. For example, a cube can be configured with a motion sensor and can communicate an indication that a user is shaking the cube.

The robot 400 can also use inputs received from one or more environmental sensors that each indicate a particular property of the environment of the robot. Example environmental sensors include temperature sensors and humidity sensors to name just a few examples.

One or more of the input subsystems described above may also be referred to as "sensor subsystems." The sensor subsystems allow a robot to determine when a user is interacting with the robot, e.g., for the purposes of providing user input, using a representation of the environment rather than through explicit electronic commands, e.g., commands generated and sent to the robot by a smartphone application. The representations generated by the sensor subsystems may be referred to as "sensor inputs."

The robot 400 also includes computing subsystems having data processing hardware, computer-readable media, and networking hardware. Each of these components can serve to provide the functionality of a portion or all of the input and output subsystems described above or as additional input and output subsystems of the robot 400, as the situation or application requires. For example, one or more integrated data processing apparatus can execute computer program instructions stored on computer-readable media in order to provide some of the functionality described above.

The robot 400 can also be configured to communicate with a cloud-based computing system having one or more computers in one or more locations. The cloud-based computing system can provide online support services for the robot. For example, the robot can offload portions of some of the operations described in this specification to the cloud-based system, e.g., for determining behaviors, computing signals, and performing natural language processing of audio streams.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart-phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A robot comprising:
one or more processors;
one or more sensor subsystems;
one or more storage devices storing instructions that are operable, when executed by the one or more processors, to cause an agent to perform operations comprising:
receiving first sensor data from the one or more sensor subsystems;
determining a presence of a human based at least in part on the first sensor data;
receiving second sensor data from the one or more sensor subsystems, the second sensor data indicating an action of the human; and
determining at least one of mapping data and localization data based at least in part on the second sensor data;
wherein the operations further comprise prompting the human for input via a mobile computing device.

2. The robot of claim 1 wherein prompting the user for input via a mobile computing device comprises prompting the human to record a portion of an environment using a camera on the mobile computing device.

3. The robot of claim 1 wherein the operations further comprise physically navigating around an environment of the robot to generate a map of the environment of the robot.

4. The robot of claim 1 wherein the operations further comprise updating an emotion state of the robot by increasing one or more emotional aspects of the emotion state; and selecting an action for the robot to perform based on the updated emotion state of the robot.

5. The robot of claim 1 wherein determining the presence of a human based at least in part on the first sensor data comprises identifying the human based at least in part on the first sensor data and wherein the operations further comprise selecting an action for the robot to perform based at least in part on the human's identity.

6. The robot of claim 1 wherein the second sensor data includes the first sensor data.

7. The robot of claim 1 wherein the robot is a security robot.

8. The robot of claim 1 wherein the robot is a drone.

9. The robot of claim 1 wherein receiving second sensor data indicating an action comprises receiving second sensor data indicating an action in response to the prompting.

10. The robot of claim 9 wherein prompting the human comprises prompting the human with sound.

11. An agent comprising:
one or more processors;
one or more sensor subsystems;
one or more storage devices storing instructions that are operable, when executed by the one or more processors, to cause the agent to perform operations comprising:
  receiving first sensor data from the one or more sensor subsystems;
  determining a presence of a living being based at least in part on the first sensor data;
  receiving second sensor data from the one or more sensor subsystems, the second sensor data indicating an action of the living being; and
  determining mapping data based at least in part on the second sensor data;
  wherein the living being is a human, wherein the operations further comprise prompting the human for input via a mobile computing device.

12. The agent of claim 11 wherein the living being is a human, wherein the operations further comprise prompting the human for the input and wherein receiving second sensor data comprises receiving input, via the second sensor data, in response to the prompting.

13. The agent of claim 11 wherein prompting the human comprises prompting the human with sound.

14. An agent comprising:
one or more processors;
one or more sensor subsystems;
one or more storage devices storing instructions that are operable, when executed by the one or more processors, to cause the agent to perform operations comprising:
  receiving first sensor data from the one or more sensor subsystems;
  determining a presence of a living being based at least in part on the first sensor data;
  receiving second sensor data from the one or more sensor subsystems, the second sensor data indicating an action of the living being; and
  determining mapping data based at least in part on the second sensor data, prompting the human with sound, and
prompting the human for input via a mobile computing device, the prompting comprising prompting the human to record a portion of an environment using a camera on the mobile computing device.

15. The agent of claim 11 wherein the operations further comprise physically navigating around an environment of the agent to generate a map of the environment of the agent.

16. The agent of claim 11 wherein determining the presence of a living being based at least in part on the first sensor data comprises identifying a human based at least in part on the first sensor data and wherein the operations further comprise updating an emotion state of the agent by increasing one or more emotional aspects of the emotion state; and selecting an action for the agent to perform based on the updated emotion state of the agent and based on the human's identity.

17. The agent of claim 11 wherein the operations further comprise detecting based at least in part on the first sensor data a living being that is in sufficient proximity to the agent such that the agent can obtain sensor data regarding actions of the living being.

18. A system comprising:
a robot having:
  one or more processors;
  one or more sensor subsystems;
  one or more storage devices storing instructions that are operable, when executed by the one or more processors, to cause an agent to perform robot operations comprising:
    receiving first sensor data from the one or more sensor subsystems;
    determining a presence of a user based at least in part on the first sensor data;
    receiving second sensor data from the one or more sensor subsystems regarding actions of the user; and
    determining mapping data based at least in part on the second sensor data; and
an application configured for operation on a mobile computing device and configured for user interaction with the robot; and
wherein the robot operations further comprise prompting the user to record a portion of an environment using a camera on the mobile computing device, the application performs application operations comprising transmitting a recorded portion of the environment to the robot, and the robot operations further comprise receiving the recorded portion of the environment and modifying a map based at least in part on the recorded portion of the environment.

* * * * *